(12) United States Patent
Gupta

(10) Patent No.: US 9,458,968 B2
(45) Date of Patent: Oct. 4, 2016

(54) HYDROGEN DISPENSING PROCESS AND SYSTEM

(75) Inventor: Nikunj Gupta, Bangalor (IN)

(73) Assignee: Shell Oil Company, Houston, TX (US)

( * ) Notice: Subject to any disclaimer, the term of this patent is extended or adjusted under 35 U.S.C. 154(b) by 148 days.

(21) Appl. No.: 14/003,007

(22) PCT Filed: Mar. 9, 2012

(86) PCT No.: PCT/EP2012/054081
§ 371 (c)(1),
(2), (4) Date: Jan. 9, 2014

(87) PCT Pub. No.: WO2012/123349
PCT Pub. Date: Sep. 20, 2012

(65) Prior Publication Data
US 2014/0110017 A1    Apr. 24, 2014

Related U.S. Application Data

(60) Provisional application No. 61/451,773, filed on Mar. 11, 2011.

(51) Int. Cl.
*F17C 5/06* (2006.01)
*F17C 5/00* (2006.01)
*F17C 7/00* (2006.01)

(52) U.S. Cl.
CPC .................. *F17C 5/06* (2013.01); *F17C 5/007* (2013.01); *F17C 7/00* (2013.01); *F17C 2203/0617* (2013.01); *F17C 2203/0639* (2013.01); *F17C 2203/0643* (2013.01); *F17C 2203/0646* (2013.01); *F17C 2205/0142* (2013.01); *F17C 2205/0323* (2013.01);

(Continued)

(58) Field of Classification Search
USPC .......... 141/4, 69, 82, 83, 99, 100, 234, 236, 141/311 R
See application file for complete search history.

(56) References Cited

U.S. PATENT DOCUMENTS 4,860,804 A * 8/1989 Yamaguchi et al. ............ 141/94
4,887,857 A * 12/1989 VanOmmeren ................... 141/1

(Continued)

FOREIGN PATENT DOCUMENTS

DE    19933987    1/2001
DE    102006034791    1/2008

(Continued)

OTHER PUBLICATIONS

Cengel et al.; Thermodynamics: An Engineering Approach, William C. Brown Pub., 3rd edition; pp. 220-229; 1997.

*Primary Examiner* — Mark A Laurenzi
*Assistant Examiner* — Andrew Schmid

(57) ABSTRACT

The present invention provides a process for dispensing gaseous hydrogen, comprising the steps of: a) providing a first vessel comprising a first quantity of gaseous hydrogen at a pressure in the range of from 350 to 1000 bar absolute and a temperature in the range of from −20° C. to 50° C.; b) passing in the range of from 40 to 100 wt %, based on the weight of the first quantity, of the first quantity gaseous hydrogen from the first vessel through an isenthalpic valve to obtain a cold second quantity of gaseous hydrogen having a temperature in the range of from −100 to −20° C.; and c) dispensing the cold second quantity of gaseous hydrogen to a second vessel. In a further aspect the invention provides a system for dispensing gaseous hydrogen.

9 Claims, 1 Drawing Sheet

(52) U.S. Cl.
CPC   *F17C 2205/0355* (2013.01); *F17C 2221/012* (2013.01); *F17C 2223/0123* (2013.01); *F17C 2223/035* (2013.01); *F17C 2223/036* (2013.01); *F17C 2225/0123* (2013.01); *F17C 2225/036* (2013.01); *F17C 2227/0157* (2013.01); *F17C 2227/036* (2013.01); *F17C 2227/0337* (2013.01); *F17C 2227/0344* (2013.01); *F17C 2227/0383* (2013.01); *F17C 2227/043* (2013.01); *F17C 2250/01* (2013.01); *F17C 2260/023* (2013.01); *F17C 2265/065* (2013.01); *F17C 2270/0139* (2013.01); *Y02E 60/321* (2013.01)

(56) References Cited

U.S. PATENT DOCUMENTS

| | | | | |
|---|---|---|---|---|
| 5,365,981 | A * | 11/1994 | Peschka et al. | 141/7 |
| 5,370,159 | A * | 12/1994 | Price | 141/4 |
| 5,385,176 | A * | 1/1995 | Price | 141/1 |
| 5,427,160 | A * | 6/1995 | Carson et al. | 141/4 |
| 5,542,459 | A * | 8/1996 | Price et al. | 141/18 |
| 5,687,776 | A * | 11/1997 | Forgash et al. | 141/11 |
| 5,762,119 | A * | 6/1998 | Platz et al. | 141/231 |
| 5,771,946 | A * | 6/1998 | Kooy et al. | 141/82 |
| 5,913,344 | A * | 6/1999 | Wronski et al. | 141/83 |
| 6,182,717 | B1 * | 2/2001 | Yamashita | 141/82 |
| 6,202,707 | B1 * | 3/2001 | Woodall et al. | 141/1 |
| 6,305,442 | B1 * | 10/2001 | Ovshinsky et al. | 141/231 |
| 6,354,088 | B1 * | 3/2002 | Emmer et al. | 62/50.1 |
| 6,536,485 | B1 * | 3/2003 | O'Brien | 141/3 |
| 6,755,225 | B1 * | 6/2004 | Niedwiecki et al. | 141/231 |
| 6,810,924 | B2 * | 11/2004 | White | 141/82 |
| 6,904,944 | B2 * | 6/2005 | Satou et al. | 141/100 |
| 7,128,103 | B2 * | 10/2006 | Mitlitsky et al. | 141/248 |
| 7,168,464 | B2 * | 1/2007 | Diggins | 141/105 |
| 7,169,489 | B2 * | 1/2007 | Redmond | 429/515 |
| 7,275,569 | B2 * | 10/2007 | Hobbs | 141/97 |
| 7,337,811 | B1 * | 3/2008 | Keip | 141/4 |
| 7,360,563 | B2 * | 4/2008 | Mitlitsky | 141/2 |
| 7,377,294 | B2 * | 5/2008 | Handa | 141/82 |
| 7,413,585 | B2 * | 8/2008 | Da Silva et al. | 48/174 |
| 7,484,540 | B2 * | 2/2009 | Pechtold | 141/82 |
| 7,568,507 | B2 * | 8/2009 | Farese et al. | 141/95 |
| 7,624,770 | B2 * | 12/2009 | Boyd et al. | 141/11 |
| 7,891,386 | B2 * | 2/2011 | Handa | 141/82 |
| 7,921,883 | B2 * | 4/2011 | Cohen et al. | 141/49 |
| 8,020,589 | B2 * | 9/2011 | Cohen et al. | 141/95 |
| 8,151,834 | B2 * | 4/2012 | Kurita et al. | 141/105 |
| 8,156,970 | B2 * | 4/2012 | Farese et al. | 141/94 |
| 8,210,214 | B2 * | 7/2012 | Casey et al. | 141/4 |
| 8,522,835 | B2 * | 9/2013 | McLean et al. | 141/197 |
| 8,594,954 | B2 * | 11/2013 | Macron et al. | 702/55 |
| 2002/0100518 | A1 * | 8/2002 | Kuriiwa et al. | 141/4 |
| 2004/0093874 | A1 * | 5/2004 | Bradley et al. | 62/46.1 |
| 2004/0194499 | A1 * | 10/2004 | Grenfell | 62/612 |
| 2005/0178463 | A1 * | 8/2005 | Kountz et al. | 141/4 |
| 2006/0016512 | A1 * | 1/2006 | Takano et al. | 141/82 |
| 2006/0180235 | A1 * | 8/2006 | Kubo et al. | 141/82 |
| 2007/0113918 | A1 * | 5/2007 | Kanoya et al. | 141/82 |
| 2007/0257043 | A1 * | 11/2007 | Kanoya et al. | 220/581 |
| 2008/0060714 | A1 * | 3/2008 | Kallo | 141/82 |
| 2008/0156392 | A1 * | 7/2008 | Kohno | 141/4 |
| 2008/0202629 | A1 * | 8/2008 | Michel et al. | 141/5 |
| 2008/0245437 | A1 * | 10/2008 | Shige | 141/4 |
| 2008/0264514 | A1 * | 10/2008 | Tessier et al. | 141/4 |
| 2009/0127137 | A1 * | 5/2009 | Golz et al. | 206/7 |
| 2009/0205745 | A1 * | 8/2009 | Farese et al. | 141/12 |
| 2009/0250138 | A1 * | 10/2009 | Bavarian et al. | 141/4 |
| 2010/0005812 | A1 * | 1/2010 | Watts et al. | 62/50.2 |
| 2010/0012219 | A1 * | 1/2010 | Shibukawa et al. | 141/4 |
| 2010/0024542 | A1 * | 2/2010 | Yen et al. | 73/290 R |
| 2010/0044020 | A1 * | 2/2010 | Kojima | 165/154 |
| 2010/0059528 | A1 * | 3/2010 | Zhevago et al. | 220/592 |
| 2010/0307636 | A1 * | 12/2010 | Uemura | 141/4 |
| 2011/0041949 | A1 * | 2/2011 | Gupta et al. | 141/4 |
| 2012/0018033 | A1 * | 1/2012 | Nakazawa et al. | 141/4 |
| 2012/0111447 | A1 * | 5/2012 | Mori et al. | 141/4 |
| 2012/0216915 | A1 * | 8/2012 | Takata et al. | 141/82 |
| 2013/0202988 | A1 * | 8/2013 | Wang et al. | 429/513 |
| 2013/0298570 | A1 * | 11/2013 | Dickens et al. | 60/780 |
| 2014/0102587 | A1 * | 4/2014 | Nagura et al. | 141/69 |
| 2014/0110017 | A1 * | 4/2014 | Gupta | 141/4 |
| 2014/0174588 | A1 * | 6/2014 | Yim | 141/1 |
| 2014/0196814 | A1 * | 7/2014 | Nagura et al. | 141/82 |
| 2014/0216599 | A1 * | 8/2014 | Loewenthal | 141/4 |
| 2014/0261874 | A1 * | 9/2014 | Mathison | 141/11 |

FOREIGN PATENT DOCUMENTS

| | | | |
|---|---|---|---|
| DE | 102006047313 | 4/2008 | |
| DE | 102009037109 | 2/2011 | |
| EP | 2148127 | 1/2010 | |
| EP | 2148127 A2 * | 1/2010 | F17C 13/08 |
| FR | 2935774 | 9/2008 | |
| WO | 2006045712 | 5/2006 | |
| WO | WO 2006045712 A1 * | 5/2006 | F25B 9/004 |

* cited by examiner

HYDROGEN DISPENSING PROCESS AND SYSTEM

PRIORITY CLAIM

The present application which is a 371 application of PCT/EP2012/054081 which claims priority from PCT/EP2012/054081, filed 9 Mar. 2012, which claims priority from U.S. provisional application 61/451,773, filed 11 Mar. 2011, which is incorporated herein by reference.

FIELD OF THE INVENTION

This invention relates to a process for dispensing hydrogen and a system for dispensing hydrogen.

BACKGROUND OF THE INVENTION

In recent years, there has been a great deal of interest in the development of alternative energy sources, or energy carriers, such as hydrogen. Automobiles and other vehicles that use hydrogen as a fuel source have been developed, but methods for refuelling these vehicles that can compete with gasoline fuelling stations on scale or cost have not yet been developed. Gasoline refuelling methods are very simple and typically only consist of providing gasoline from a tank for storing the gasoline via one or more pumps to the vehicle fuel tank. Hydrogen refuelling, in particular high pressure gaseous hydrogen refuelling, is more complicated. One phenomenon that complicates gaseous hydrogen refuelling is that the temperature in the vehicle tank increases during gaseous hydrogen refuelling. The temperature increase is due to the thermodynamic phenomenon of gas heating once it is converted from a flowing gas to a static gas in the vehicle tank. Generally, the vehicle hydrogen tank is only certified to a maximum of 85° C. To ensure the temperature in the vehicle tank stays below the maximum certified temperature, the gaseous hydrogen is required to cool to approximately −40° C., prior to dispensing it to the vehicle, i.e. in case of the hydrogen is provided at 700 bar.

One option, which has been developed, is to cool or pre-cool the gaseous hydrogen using a refrigeration based heat exchanger system. However, these systems, in particular the refrigeration system, are expensive, have long response times and involve many moving parts making their maintenance intensive. A second approach, which has been suggested, is to use a liquid nitrogen-based cooling. Although, such an approach shortens the response times considerably, it is expensive and introduces an infrastructure problem, related to the delivery and storage of liquid nitrogen at the refuelling station. In addition it is difficult to scale up. A third approach relies on a slow refuelling process that allows the heat to dissipate during the refuelling process. However, this leads to very long refuelling times.

To provide a suitable hydrogen dispensing system, the system must be fast, while being much simpler and cheaper. In addition, the maintenance requirements and energy use must be reduced to make hydrogen fuelling stations a viable alternative to gasoline stations.

SUMMARY OF THE INVENTION

It has now been found that an energy efficient and fast pre-cooling of gaseous hydrogen can be accomplished by providing the gaseous hydrogen from the large gaseous hydrogen storage vessel to a smaller intermediate vessel and subsequently cooling the gaseous hydrogen using the inverse thermodynamic phenomenon that causes the hydrogen to heat in the vehicle tank prior to providing the hydrogen to the hydrogen tank of a vehicle.

Accordingly, the present invention provides a process for dispensing gaseous hydrogen, comprising the steps of:
a) providing a first vessel comprising a first quantity of gaseous hydrogen at a pressure in the range of from 350 to 1000 bar absolute and a temperature in the range of from −20° C. to 50° C.;
b) passing in the range of from 40 to 100 wt %, based on the weight of the first quantity, of the first quantity of gaseous hydrogen from the first vessel through an isenthalpic valve to obtain a cold second quantity of gaseous hydrogen having a temperature in the range of from −100 to −20° C.; and
c) dispensing the cold second quantity of gaseous hydrogen to a second vessel.

The process according to the present invention does not require the use of a refrigeration system or liquid nitrogen thereby reducing the energy cost, maintenance and infrastructure requirements.

In another aspect, the invention provides a system for dispensing gaseous hydrogen, comprising:
 a first vessel, suitable to contain at least pressurised gaseous hydrogen at a pressure above 250 bar absolute having an inlet and an outlet for gaseous hydrogen;
 a gaseous hydrogen dispenser having an inlet and an outlet for gaseous hydrogen;
 means for providing gaseous hydrogen from the outlet of the first vessel to the inlet of the gaseous hydrogen dispenser; and
 an isenthalpic valve suitable for controlling a flow of gaseous hydrogen,
wherein the isenthalpic valve is or is a part of outlet for gaseous hydrogen of the first vessel or is located in the means for providing gaseous hydrogen from the first vessel to the gaseous hydrogen dispenser.

DETAILED DESCRIPTION OF THE INVENTION

Figure 1:
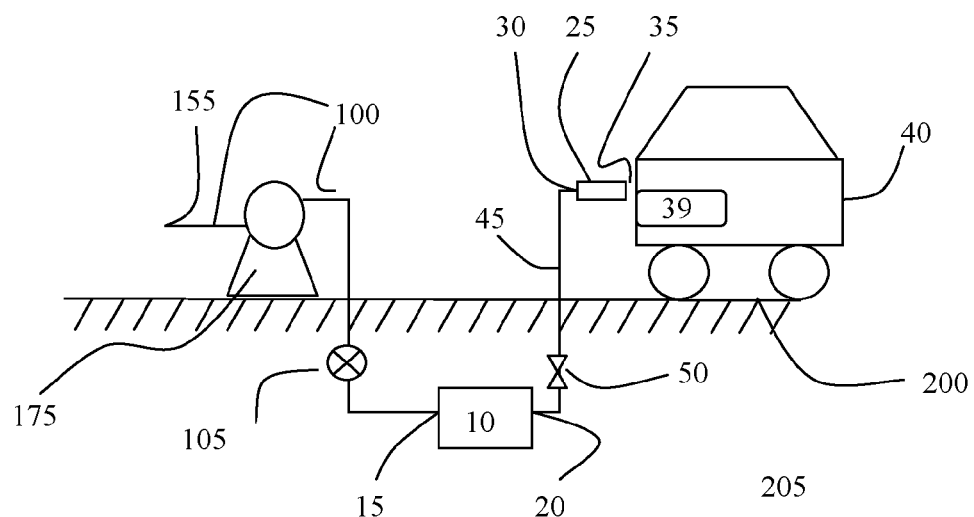
FIG. 1 provides a schematic representation of a system according to the invention.

The invention described herein provides a process for dispensing gaseous hydrogen. In the process according to the invention gaseous hydrogen is cooled prior to being dispensed to the fuel tank of a vehicle. It is known that during the refuelling of a gaseous hydrogen tank, the temperature in the tank increases. Without wishing to be bound to any particular theory, it is believed that this temperature increase is related to the thermodynamics of the refuelling process. During refuelling, a thermodynamic conversion of the thermodynamic work of the flowing hydrogen exiting the nozzle of the gaseous hydrogen dispenser into internal energy of the static hydrogen in the vehicle tank will occur.

In a typical conventional refuelling process, i.e. a conventional process for dispensing gaseous hydrogen, when the gaseous hydrogen is delivered to a vehicle's hydrogen tank its thermodynamic state changes from a gas in motion to a stationary or static gas, while the enthalpy of the hydrogen gas remains constant. With the enthalpy (H) of the gaseous hydrogen being defined as the sum of the internal energy of the system (U) plus the product of its volume multiplied by the pressure exerted on it by its surroundings (PV, also referred to as work), the PV energy of the moving gaseous hydrogen is converted into internal energy U of the stationary gaseous hydrogen. This conversion is observed as a higher gas temperature in the tank, under the condition that the refuelling of the vehicle tank is an adiabatic process, i.e. no energy transferred to the vehicle tank itself and no work (PV) is done by the gaseous hydrogen in the tank. Further background of the described thermodynamic effects can be found for instance in Cengel et al., Thermodynamics: An Engineering Approach, William C Brown Pub, $3^{rd}$ ed, 1997, pages 220-229.

Theoretically, this thermodynamic conversion may result in a temperature increase of the gaseous hydrogen of up to 100° C. and higher depending on the pressure of the gaseous hydrogen. In practice, there will be a pressure drop between the nozzle of the gaseous hydrogen dispenser and the vehicle tank and the refilling process is not entirely adiabatic as some heat transfer from the gaseous hydrogen to the tank walls will mitigate part of the temperature rise. However, these effects only have a minor effect on the temperature rise of the gaseous hydrogen as it is passed into the hydrogen tank.

The present invention uses the inverse thermodynamic effect as described herein above. Gaseous hydrogen is first cooled using the inverse thermodynamic effect and subsequently passed to the hydrogen tank of a vehicle, wherein the temperure of gaseous hydrogen is increased as described herein above.

In the process according to the present invention, in step (a) a first vessel is provided comprising a first quantity of gaseous hydrogen. Reference herein to the first quantity is to a quantity measured in weight units. Preferably, the first quantity of gaseous hydrogen is sufficient to refuel at least one hydrogen tank of a vehicle. More preferably, the first quantity is in the range of from 1 to 3, even more preferably 1.1 to 2 times the weight capacity of the hydrogen tank of a vehicle to be refuelled. When the vehicle is a normal car, the capacity of the hydrogen tank may be in the range of from 3 to 7 kg of hydrogen. In case the vehicle is a bus or a truck the capacity of the hydrogen tank may be as large as in the range of from 4 to 15 kg of hydrogen.

The pressure of the first quantity of gaseous hydrogen in the first vessel is in the range of 350 to 1000 bar absolute, more preferably, 360 to 850 bar absolute. The exact choice of the pressure in the first vessel will be based on the required pressure at which the hydrogen is dispensed to the hydrogen tank of the vehicle. Preferably, the pressure in the first vessel is 0.1 to 150 bar, more preferably 0.15 to 35 bar higher than the dispensing pressure, to provide a driving force for flowing the hydrogen toward the hydrogen tank of a vehicle. The temperature of the first quantity of gaseous hydrogen in the first vessel is in the range of from −20° C. to 50° C., more preferably 0° C. to 35° C. Preferably, the temperature is equal or close to temperature outside of the vessel. For instance, if the first vessel is located above surface, the temperate is preferably the ambient temperature. If the if the first vessel is located subsurface, the temperature is preferably the subsurface temperature.

In step (b) of the process, in the range of from 40 to 100 wt %, based on the total weight of the first quantity of gaseous hydrogen of the first quantity of gaseous hydrogen, is passed from the first vessel through an isenthalpic valve, and is dispensed to a second vessel in step (c). Preferably, the second vessel is a hydrogen tank of a vehicle.

An isenthalpic valve is also known as a Joule-Thompson valve or an adiabatic valve. By passing at least part of the first quantity of gaseous hydrogen through the isenthalpic valve, the temperature of the gaseous hydrogen deceases due to the conversion of internal energy to work (PV). However, due to the nature of the thermodynamic phenomena and the high thermal conductivity of the pressurised gaseous hydrogen, not only the hydrogen that passes through the isenthalpic valve, but also the hydrogen that remains in the first vessel is cooled. Should only a small fraction of the first quantity of gaseous hydrogen be passed through the isenthalpic valve, the cooling effect is only small as the whole first quantity contributes to the cooling, i.e. the internal energy (U) required to be converted to work (PV) of the small fraction is provided by all the hydrogen in the first fraction. Nonetheless, as this relative small fraction is passed into the hydrogen tank of the vehicle the temperature increase will be high as only a small fraction will reheat as the work (PV) is converted back into internal energy (U). As a result, the temperature increase may be significantly larger than the temperature decrease caused by passing the hydrogen through the isenthalpic valve. This is why the effect to the thermodynamic conversion of internal energy of the hydrogen to work of the flowing hydrogen is not effectively seen in a conventional hydrogen refuelling station. In such a hydrogen refuelling station, a relatively small quantity of gaseous hydrogen is supplied directly from the typically very large gaseous hydrogen storage vessel directly to the vehicle tank. As a result, the hydrogen in the whole large gaseous hydrogen storage is cooled, but due to the large volume, the temperature reduction is minimal.

By passing at least 40 wt % of the first quantity of gaseous hydrogen through the isenthalpic valve, sufficient cooling is achieved to ensure that the final temperature of the gaseous hydrogen in the second vessel, preferably a hydrogen tank of a vehicle, is within the required ranges.

Preferably, in the range of from 50 to 99 wt %, more preferably of from 75 to 98.5 wt %, based on the total weight of the first quantity of gaseous hydrogen of the first quantity of gaseous hydrogen, is passed from the first vessel through the isenthalpic valve, to further ensure sufficient cooling of the gaseous hydrogen to be dispensed. The cold gaseous hydrogen obtained by passing at least part of first quantity of gaseous hydrogen through the isenthalpic valve is referred to as the cold second quantity of gaseous hydrogen. The cold second quantity of gaseous hydrogen has a temperature in the range of from −100 to −20° C.

In step (c) of the process, the cold second quantity of gaseous hydrogen is dispensed to a second vessel, preferably a hydrogen tank of a vehicle. As the cold gaseous hydrogen is stored in the second vessel, its temperature will increase again as described herein above. However, due to the lowered starting temperature of the cold second quantity, the final temperature of the gaseous hydrogen in the second vessel will also be lower than expected with cooling the first quantity.

Following step (c), the first vessel may be refilled to replace the gaseous hydrogen that was dispensed in step (c). Preferably, therefore, the process further comprises a step (d). In step (d) further gaseous hydrogen is provided to the first vessel to replace the hydrogen which was passed through the isenthalpic valve in step (b) and dispensed in step (c).

The further gaseous hydrogen may be provided from any source of hydrogen including a gaseous hydrogen storage vessel, a gaseous hydrogen pipeline or pipeline infrastructure or from hydrogen generation processes including but not limited to an electrolysis process, oxidation or partial oxidation process, steam reforming process. Preferably, the further gaseous hydrogen is provided from a gaseous hydrogen storage vessel or a gaseous hydrogen pipeline or pipeline infrastructure, as these can provide a constant supply of hydrogen.

The further gaseous hydrogen may be provided to the first vessel through a pump or a compressor. In the case, where the pressure of the further hydrogen is too low, it may be compressed to increase the pressure using for instance a compressor.

Preferably, during step (b) no further hydrogen is provided to the first vessel.

As described herein above, during step (b) not only the gaseous hydrogen, which is passed through the isenthalpic valve is cooled by the conversion of internal energy (U) to work (PV), but also any gaseous hydrogen that remains in the first vessel is cooled to the same temperature. This remaining cold gaseous hydrogen may be used to, at least partially, eliminate or reduce any temperature increases that may be experienced when providing the further gaseous hydrogen to the first vessel. Preferably, in the range of from 0.1 to 60 wt %, based on the total weight of the first quantity of gaseous hydrogen, of the first quantity of gaseous hydrogen remains in the first vessel during step (b), more preferably of from 1 to 50 wt %, even more preferably 1.5 to 25 wt %, based on the total weight of the first quantity of gaseous hydrogen. Should nevertheless, during step (d), the temperature in the first vessel increase above the preferred temperature range as provided in step (a) of the process according to the invention, it may be necessary to cool the further gaseous hydrogen. In that case preferably step (d) further comprises cooling the further gaseous hydrogen, more preferably cooling the further gaseous hydrogen to a temperature in the range as defined in step (a). The further hydrogen may be cooled prior to entering the first vessel, however, preferably it is cooled inside the first vessel.

Preferably, the further hydrogen is cooled by heat exchange with a medium outside, preferably surrounding, the first vessel. Preferably, such a medium is air or, in case the first vessel is located subsurface, soil. By locating the first vessel subsurface, a relatively constant temperature of surrounding medium, typically soil, is provided while the footprint is reduced, therefore it is preferred to locate the first vessel subsurface.

To ensure, a good heat exchange between the gaseous hydrogen in the first vessel and the medium outside of the first vessel, it is preferred that the first vessel provides good heat exchange properties. In one embodiment, the first vessel will comprise a metal wall or walls, preferably, a steel, stainless steel or aluminium wall(s). Less preferred, but possible, are first vessels that are insulated. Insulted vessels will not allow a good transfer of heat from the gaseous hydrogen inside the first vessel to the surrounding medium. However, insulated vessels will help in retaining cooling provided by evacuation during the dispensing phase.

In addition, it is possible to provide further cooling means to actively cool the further hydrogen.

Preferably, the first vessel has a capacity for gaseous hydrogen in the range of from 2 to 30 kg, more preferably 3 to 15 kg of gaseous hydrogen. Limiting the capacity of the first vessel benefits the cooling effectuated in step (b) of the process, but also benefits any cooling of further hydrogen provided in preferred step (d).

Following step (d), the process may be continued by initiating a new sequence of step (a) to (c), preferably (a) to (d).

The process may be operated by providing more than one first vessel in parallel, preferably operated such that a constant supply of cold gaseous hydrogen is available for dispensing.

The present invention further provides a system for dispensing gaseous hydrogen. The system according to the invention is further described herein below, with reference to FIG. 1.

The system for dispensing gaseous hydrogen according to the present invention comprises a first vessel 10, having an inlet 15 for gaseous hydrogen and an outlet 20 for gaseous hydrogen. The first vessel is a vessel suitable to contain pressurised gaseous hydrogen at pressures above 250 bar absolute, preferably in the range of from 350 to 1000 bar absolute.

The system further comprises a gaseous hydrogen dispenser 25, having an inlet 30 for gaseous hydrogen and an outlet 35 for gaseous hydrogen, preferably outlet 35 is suitable for providing cold pressurised gaseous hydrogen to a second vessel, preferably second vessel is the hydrogen tank 39 of vehicle 40. Preferably, the dispenser is at least partly insulted to prevent any heating the gaseous hydrogen.

The system comprises a means 45 to provide gaseous hydrogen from the outlet 20 of first vessel 10 to the inlet 30 of dispenser 25. The means 45 may be for instance be a conduit, pipe or hose, and is suitable to withstand temperatures as low as −50° C., preferably −100° C. Preferably, the means 45, e.g. a conduit, pipe or hose, is at least partly insulated to prevent any heating of gaseous hydrogen in the means.

Insulating the dispenser 25 and/or the means 45 prevents that the gaseous hydrogen is heated while being provided from the first vessel 10 to dispenser 25 and ultimately the hydrogen tank of a vehicle that is being refuelled. An increase of the temperature of the gaseous hydrogen will result in a higher final temperature of the hydrogen in the hydrogen tank of the vehicle when the refuelling procedure has ended.

The system also comprises a valve, preferably isenthalpic, 50, suitable for controlling a flow of gaseous hydrogen, in particular the flow of hydrogen passing from the first vessel 10 to the dispenser 25. Isenthalpic valve 50 is located in the means 45 for providing gaseous hydrogen from the first vessel to the gaseous hydrogen dispenser or, preferably, isenthalpic valve 50 is or is a part of outlet 20 of first vessel 10. When isenthalpic valve 50 is located in means 45, it is preferably located close to outlet 20 of the first vessel. As isenthalpic valve 50 is opened, any gaseous hydrogen in first vessel 10 undergoes a thermodynamic transition from a static state to being in motion. As a result the temperature of the gaseous hydrogen decreases.

The system may comprise a source of gaseous hydrogen suitable to provide gaseous hydrogen to the first vessel 10. In a preferred embodiment, the system further comprises a means 100 for providing gaseous hydrogen to the inlet 15 of the first vessel. The means 100 may be for instance be a conduit, pipe or hose, and is suitable to hold pressurised gaseous hydrogen. Preferably, a valve 105 is provided suitable for controlling a flow of gaseous hydrogen to halt the flow of gaseous hydrogen to the first vessel 10, when it is full. Preferably, such a valve 105 is or is part of inlet 15 for gaseous hydrogen of the first vessel 10 or is located in the means 100 for providing gaseous hydrogen to the first vessel 10.

Figure 2:
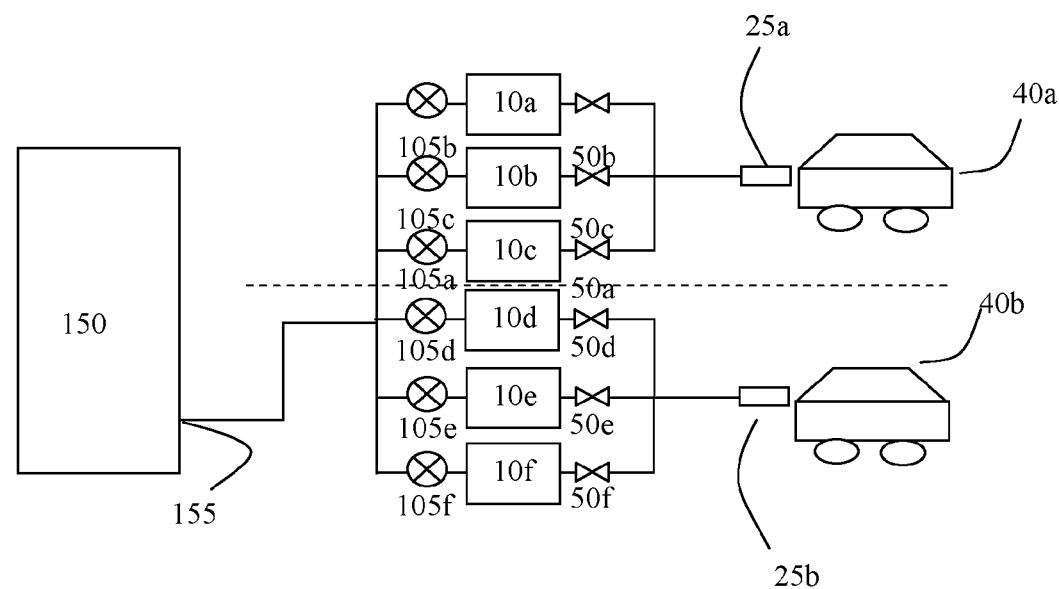
FIG. 2 provides another schematic representation of a system according to the invention.

In a preferred embodiment of the system as shown in FIG. 2, the system further comprises a gaseous hydrogen storage vessel 150, comprising at least an outlet for gaseous hydrogen 155. Preferably, means 105 is used to provide the gaseous hydrogen from the outlet 155 of storage vessel 150 to the inlet 15 of the first vessel 10.

Gaseous hydrogen storage vessel 150 may be a single vessel or may comprise a cascade of several hydrogen storage vessels.

In another preferred embodiment (not shown in FIG. 1) the hydrogen is provided by a gaseous hydrogen pipeline or pipeline infrastructure.

If required, a pump or compressor 175 may be provided in means 100. The pump or compressor 175 may be used to provide and optionally pressurise the gaseous hydrogen provided from the outlet 155 of storage vessel 150 to the inlet 15 of the first vessel 10.

As described herein above when discussing the process, it may be preferred that the first vessel allows for a heat exchange between gaseous hydrogen inside the first vessel and the medium surrounding the first vessel. Therefore, preferably the first vessel comprises walls having a high thermal conductivity, preferably metal walls, more preferably, aluminium, steel or stainless steel walls, or a combination thereof.

Preferably, the first vessel 10 is in heat exchange contact with a heat exchange medium, such a for instance air. More preferably, the first vessel is located subsurface, beneath surface 200, and in heat exchange contact with the soil 205. This not only reduces the footprint of the system, but the soil also provides a good medium to cool the gaseous hydrogen against, having a relative constant temperature and a high heat capacity.

To be able to use the inverse thermodynamic effect, as described herein above for the process, as efficient as possible, it is preferred that the capacity of the first vessel is limited. Reference herein to capacity is to a capacity based on weight of the gaseous hydrogen. Preferably, the capacity of the first vessel is in the range of from 2 to 30 kg of hydrogen, more preferably 3 to 15 kg of hydrogen.

Preferably, in case the system comprises a storage vessel for gaseous hydrogen, the capacity of first vessel is much smaller than the capacity of storage vessel 150, i.e. the capacity of the single vessel of the cumulative capacity of the cascade of storage vessels. Preferably, the capacity of the first vessel is no more than 10% (wt/wt) of the capacity of the storage vessel, based on the capacity of the storage vessel, more preferably the first vessel has a capacity of in the range of from 0.01 to 10% (wt/wt), even more preferably of from 0.02 to 5% (wt/wt), still more preferably of from 0.03 to 1% (wt/wt) of the capacity of the storage vessel, based on the capacity of the storage vessel.

With reference to FIG. 2, the system may comprise more than one first vessel 10a-f, with corresponding isenthalpic valves 50a-f and inlet valves 105a-f. In addition, the system may comprise more than one dispenser 25a and 25b. This allows several vehicles to be refuelled at the same time. By providing more than one first vessel per dispenser, several vehicles 40a and 40b can continuously and sequentially be refuelled by a single dispenser with short inter-vehicle time intervals. It will be appreciated that the number of first vessels, the number of dispensers and number of first vessels per dispenser can be selected as required.

What is claimed is:

1. A process for dispensing gaseous hydrogen, comprising the steps of:

a) providing a first vessel comprising a first quantity of gaseous hydrogen at a pressure in the range of from 350 to 1000 bar absolute and a temperature in the range of from −20° C. to 50° C.;

b) passing in the range of from 40 to 100 wt %, based on the weight of the first quantity, of the first quantity of gaseous hydrogen from the first vessel through an isenthalpic valve to obtain a cold second quantity of gaseous hydrogen having a temperature in the range of from −100 to −20° C.;

c) dispensing the cold second quantity of gaseous hydrogen to a second storage vessel; and d) providing further gaseous hydrogen to the first vessel to replace the hydrogen which was dispensed in step (c);

wherein the first vessel has a hydrogen capacity in the range of from 3 to 15 kg of hydrogen and during step (b) no further hydrogen is provided to the first vessel.

2. A process according to claim 1, wherein step (d) further comprises cooling the further gaseous hydrogen to a temperature in the range as defined in step (a) of claim 1.

3. A process according to claim 1, wherein the second storage vessel is a hydrogen fuel tank of a vehicle.

4. A process according to claim 1, wherein the further gaseous hydrogen is provided from a gaseous hydrogen storage vessel or from a pipeline.

5. A system for dispensing gaseous hydrogen, comprising:

a gaseous hydrogen storage vessel or a gaseous hydrogen pipeline comprising an outlet for gaseous hydrogen;

a first vessel, suitable to contain at least pressurised gaseous hydrogen in the range of from 3 to 15 kg at a pressure above 250 bar absolute having an inlet and an outlet for gaseous hydrogen;

means for providing gaseous hydrogen from the outlet of the hydrogen storage vessel or hydrogen pipeline to the inlet of the first vessel;

a valve suitable for controlling a flow of gaseous hydrogen which is or is part of the inlet for gaseous hydrogen of the first vessel or is located in the means for providing gaseous hydrogen to the first vessel;

a gaseous hydrogen dispenser having an inlet and an outlet for gaseous hydrogen;

an isenthalpic valve suitable for controlling a flow of gaseous hydrogen; and means for providing gaseous hydrogen from the outlet of the first vessel to the inlet of the gaseous hydrogen dispenser;

wherein the isenthalpic valve is or is a part of the outlet for gaseous hydrogen of the first vessel or is located in the means for providing gaseous hydrogen from the first vessel to the gaseous hydrogen dispenser; and wherein the means for providing gaseous hydrogen from the first vessel to the gaseous hydrogen dispenser is at least partly insulated.

6. A system according to claim 5, wherein the first vessel is located subsurface and comprises a wall having a high thermal conductivity which is in heat exchange contact with a heat exchange medium.

7. A system according to claim 6, wherein the wall having a high thermal conductivity is a metal wall.

8. A system according to claim 7 wherein the metal is selected from the group consisting of aluminium, steel, stainless steel or a combination thereof.

9. A system according to claim 6, wherein the heat exchange medium is the soil.

* * * * *